(12) United States Patent
Strait

(10) Patent No.: US 7,251,892 B2
(45) Date of Patent: Aug. 7, 2007

(54) BEARING ASSEMBLY SPACER ADJUSTABLE SYSTEM AND METHOD FOR ADJUSTING A SPACER

(75) Inventor: Sean Strait, Fonda, NY (US)

(73) Assignee: Temper Corporation, Fonda, NY (US)

( * ) Notice: Subject to any disclaimer, the term of this patent is extended or adjusted under 35 U.S.C. 154(b) by 450 days.

(21) Appl. No.: 10/616,030

(22) Filed: Jul. 9, 2003

(65) Prior Publication Data
US 2005/0005451 A1 Jan. 13, 2005

(51) Int. Cl.
B21D 53/10 (2006.01)
(52) U.S. Cl. .............................. 29/898.09; 29/898.07; 29/725; 29/407.01; 29/709; 33/517
(58) Field of Classification Search ............. 29/898.06, 29/898.07, 898.09, 725, 407.01, 407.09, 29/407.1, 707, 709; 33/517, DIG. 17
See application file for complete search history.

(56) References Cited

U.S. PATENT DOCUMENTS

| | | | |
|---|---|---|---|
| 4,067,585 A | 1/1978 | Rode | 277/200 |
| 4,125,929 A | 11/1978 | Rode | 29/446 |
| 4,214,465 A | 7/1980 | Rode | 72/36 |
| 4,492,018 A | 1/1985 | Rode | 29/437 |
| 4,611,935 A | 9/1986 | Rode | 384/548 |
| 5,224,259 A | 7/1993 | Rode | 29/598 |
| 5,329,196 A | 7/1994 | Rode | 310/156 |
| 5,402,560 A | 4/1995 | Rode | 29/252 |
| 5,435,576 A | 7/1995 | Rode | 277/236 |
| 5,535,517 A | 7/1996 | Rode | 29/898.09 |
| 5,549,397 A | 8/1996 | Rode | 384/551 |
| 5,569,967 A | 10/1996 | Rode | 310/103 |
| 5,589,664 A | 12/1996 | Rode | 174/52.1 |
| 5,699,706 A | 12/1997 | Rode | 83/18 |
| 5,785,434 A | 7/1998 | Rode | 384/551 |
| 6,004,040 A | 12/1999 | Rode | 384/583 |
| 6,244,751 B1 | 6/2001 | Rode | 384/551 |
| 6,283,639 B1 | 9/2001 | Rode | 384/551 |
| 6,327,773 B1 | 12/2001 | Rode | 29/724 |
| 6,352,267 B1 | 3/2002 | Rode | 277/631 |
| 6,418,613 B1 | 7/2002 | Rode | 29/714 |
| 6,446,339 B2 * | 9/2002 | Takamizawa et al. | 29/898.09 |
| 6,461,051 B1 | 10/2002 | Rode | 384/551 |
| 6,487,775 B2 * | 12/2002 | Rode | 29/898.09 |
| 6,662,449 B2 * | 12/2003 | Rode | 29/898.09 |
| 6,684,506 B2 * | 2/2004 | Rode | 29/898.09 |
| 2003/0137089 A1 | 7/2003 | Rode | |

* cited by examiner

*Primary Examiner*—David P. Bryant
*Assistant Examiner*—Eric Compton
(74) *Attorney, Agent, or Firm*—Heslin Rothenberg Farley & Mesiti P.C.; Nicholas Mesiti, Esq.; Victor A. Cardona, Esq.

(57) ABSTRACT

A system for adjusting at least one spacer of a bearing assembly includes a force-transmitting member and a preload regulator. The force-transmitting member is configured to operatively receive a force and to transmit the force to an adjustable spacer. The preload regulator includes a first portion and a second portion movable relative to each other with the first portion being movable in response to the force and the second portion being received by and stationary relative to the bearing assembly. The preload regulator further includes a controller coupled to the first portion and the second portion with the controller being configured to detect an electrical contact between the first portion and the second portion.

23 Claims, 6 Drawing Sheets

BEARING ASSEMBLY SPACER ADJUSTABLE SYSTEM AND METHOD FOR ADJUSTING A SPACER

CROSS-REFERENCE TO RELATED APPLICATIONS

This application relates to co-owned U.S. Pat. Nos. 6,283,639, 6,004,040, 6,244,751, 4,067,585, 5,549,397, 6,327,773, and 6,461,051 B1, which are hereby incorporated by reference.

TECHNICAL FIELD

This invention relates, generally, to spindle mounted bearings and, more particularly, to adjustment of an adjustable spacer placed between such bearings mounted on a spindle, axle, shaft, or the like.

BACKGROUND ART

Anti-friction bearings may serve to decrease friction between, for example, a stator and a rotor. For instance, such bearings may allow relative rotation between a housing and a spindle extending through the housing. The housing may comprise, for example, a hub. The spindle may comprise a shaft, axle, or the like. The bearings may comprise roller bearings, for example, tapered roller bearings. In one example, the tapered roller bearings may be employed in wheel hub and axle assemblies. In another example, the tapered roller bearings may be employed in devices such as motors, pumps, or speed reducers.

A typical tapered roller bearing may include a cone having an inner race for mounting on a spindle, a cup having an outer race for mounting in a housing, and a plurality of roller elements within a roller cage positioned between the inner and outer races. Commonly, a pair of such tapered roller bearings may be mounted on a spindle for rotation relative to or within a housing. Cooperating bearings, such as a pair of tapered roller bearings, may be included in a bearing assembly, for instance, of a motor, pump, speed reducer, or transmission assembly. In one example of "direct mounting" of the tapered roller bearings, the cups may be located in the bearing assembly axially outward relative to the cones. With exemplary "indirect mounting" of the tapered roller bearings, the cups may be located in the bearing assembly axially inward relative to the cones, as will be understood by those skilled in the art.

In order to properly secure bearings for operation, it is usually necessary to retain the bearings tightly under a predetermined axial tolerance or load on the spindle, for example, so that the bearings can maintain a proper running clearance of the roller elements under the influence of the combined axial and radial forces which the bearings are designed to support. Manufacturers of such assemblies often carefully measure the space between the bearing inner races, and provide a spacer of precisely the correct dimension and load requirements to fit therebetween. The spacer is typically made of ground steel tubing to a length tolerance of plus or minus one half of one thousandths of an inch. If the bearings are not maintained at a proper tolerance and/or load the bearings may not roll properly or may prematurely wear, particularly if the bearings are maintained at too high of a load, or may, if maintained under too low of a load, have excessive play causing failure of the bearings.

An exemplary configuration for an adjustable spacer is disclosed in U.S. Pat. No. 5,549,397 to John E. Rode (entitled "Adapter Sleeve and an Adjustable Spacer with Radial Extension Useable Thereon," issued Aug. 27, 1996, and assigned to Temper Corporation), which is hereby incorporated herein by reference in its entirety. One approach to assembling or preloading a bearing arrangement is disclosed in U.S. Pat. No. 4,214,465 to Rode. The preloading or adjustment incorporates use of a deformable spacer which is assembled with the bearings using a hydraulic ram assembly.

Thus, a need exists for improving ease, accuracy, performance, repeatability and/or control of adjustment to an adjustable spacer of a bearing assembly. A need also exists for decreasing the degree of operator judgment and/or skill required (e.g., by introducing automation and/or indicators, such as for mass production situations and/or arrangements) to properly adjust the spacer. An additional need exists for decreasing dimensional measurements required to properly prepare a bearing assembly and/or a spacer thereof. Another need exists for the adjustable spacer to allow a desired adjustment to be provided for the bearing assembly. Thus, a need exists for a system improving ease, accuracy, and control of adjustment, fitting, assembling, or tailoring of workpieces, e.g. bearing assemblies and spacers thereof.

SUMMARY OF THE INVENTION

The present invention provides, in a first aspect, a spacer adjustment system for adjusting at least one spacer of a bearing assembly which includes a force-transmitting member and a preload regulator. The force-transmitting member is configured to operatively receive a force and to transmit the force to an adjustable spacer. The preload regulator includes a first portion and a second portion movable relative to each other with the first portion being movable in response to the force and the second portion being received by, and stationary relative to, the bearing assembly. The preload regulator further includes a controller coupled to the first portion and the second portion with the controller being configured to detect an electrical contact between the first portion and the second portion.

The present invention provides, in a second aspect, a method for adjusting at least one spacer of a bearing assembly which includes applying a force to a force-transmitting member and a preload regulator to move the force-transmitting member thus operatively transferring force to the at least one spacer. The force is received at the preload regulator for regulating a desired adjustment to the at least one spacer with the regulator including a first portion and a second portion which are movable relative to each other. The first portion is operatively movable with the force-transmitting member and the second portion is received by, and stationary relative to, the bearing assembly. The method further includes contacting the first portion and the second portion in response to the force to cause the preload regulator to control the force to control the movement of force-transmitting member to regulate the desired adjustment of the at least one spacer.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

In accordance with the principles of the present invention, a spacer-adjustment system and methods for adjusting at least one spacer of a bearing assembly are provided.

Figure 1:
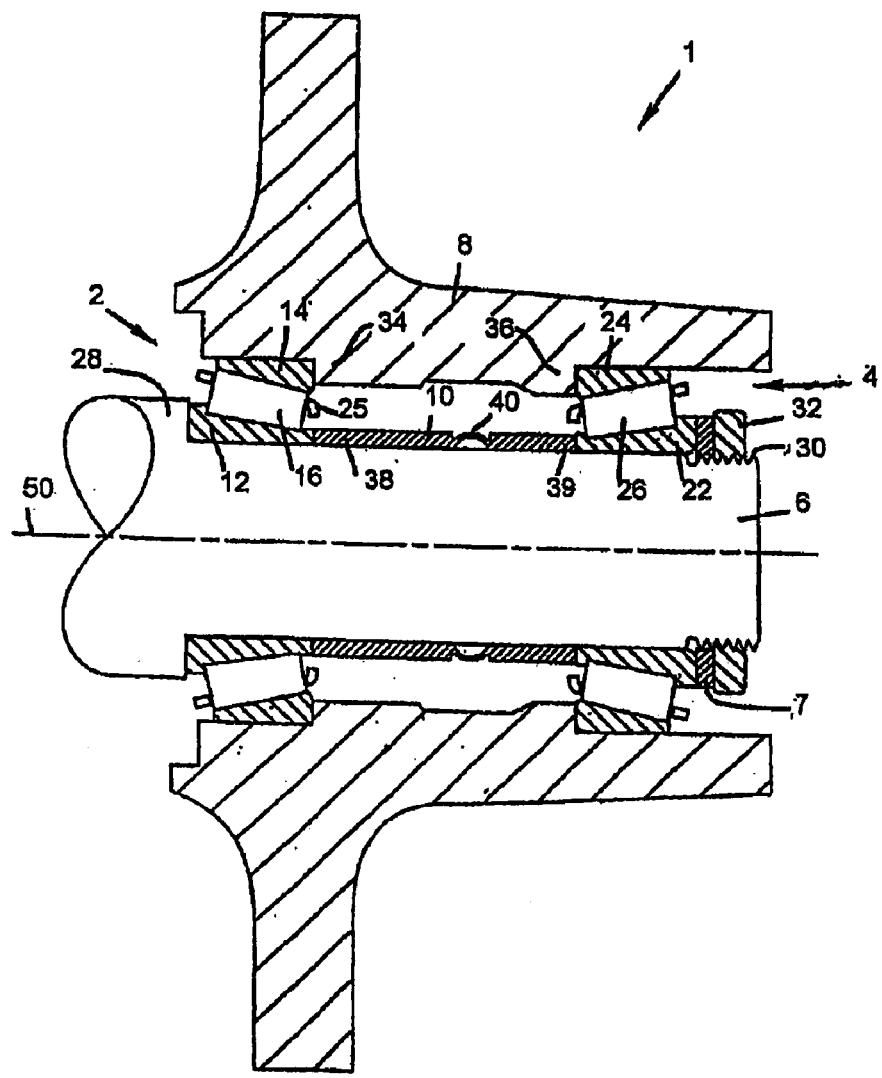
FIG. 1 is a cutaway, sectional, partial, side view of one example of an adjustable spacer in a bearing assembly located between a spindle and a housing.
Figure 2:
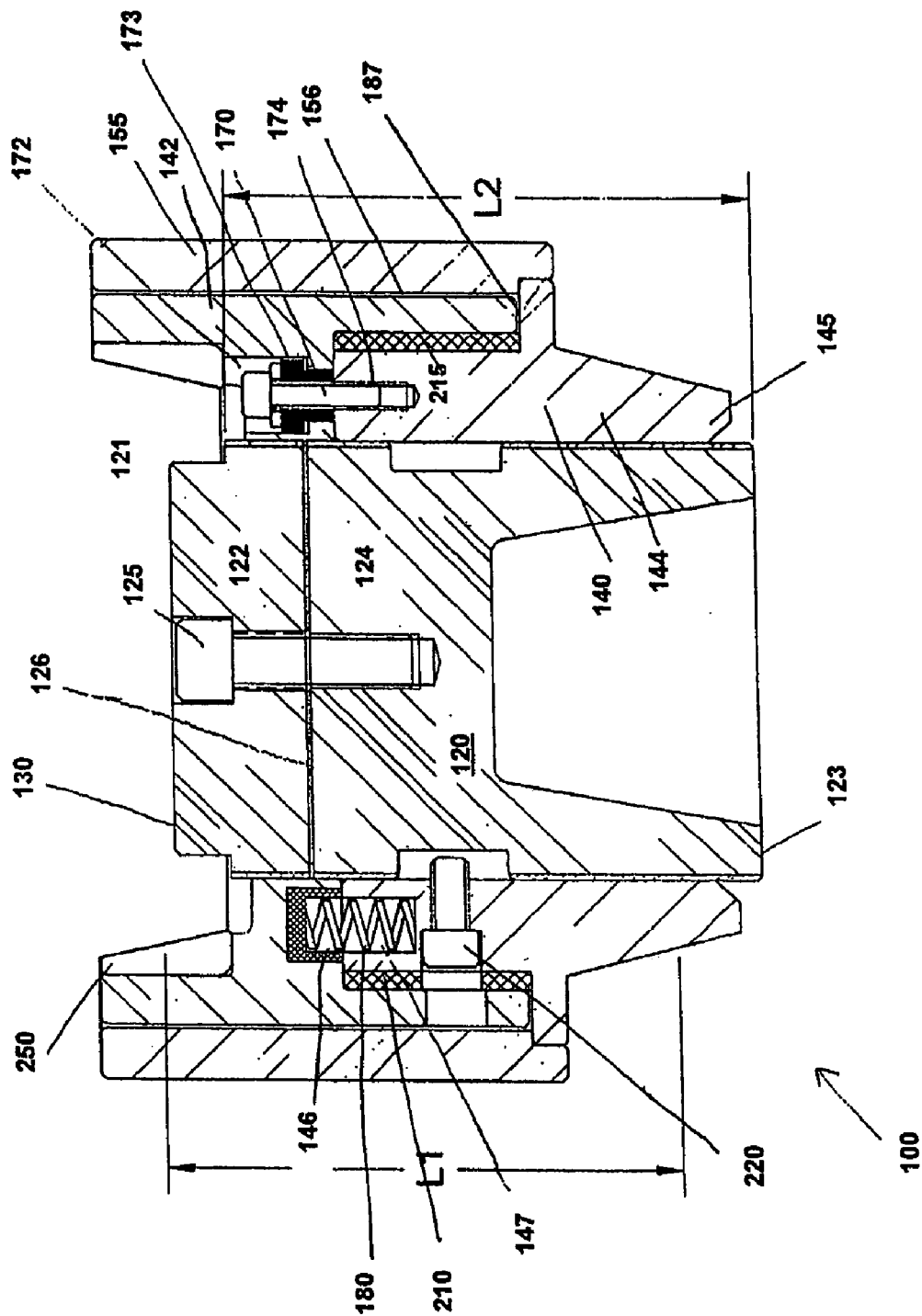
FIG. 2 is a side cross-sectional view of a system for adjusting an adjustable spacer of a bearing assembly, in accordance with the present invention.
Figure 3:
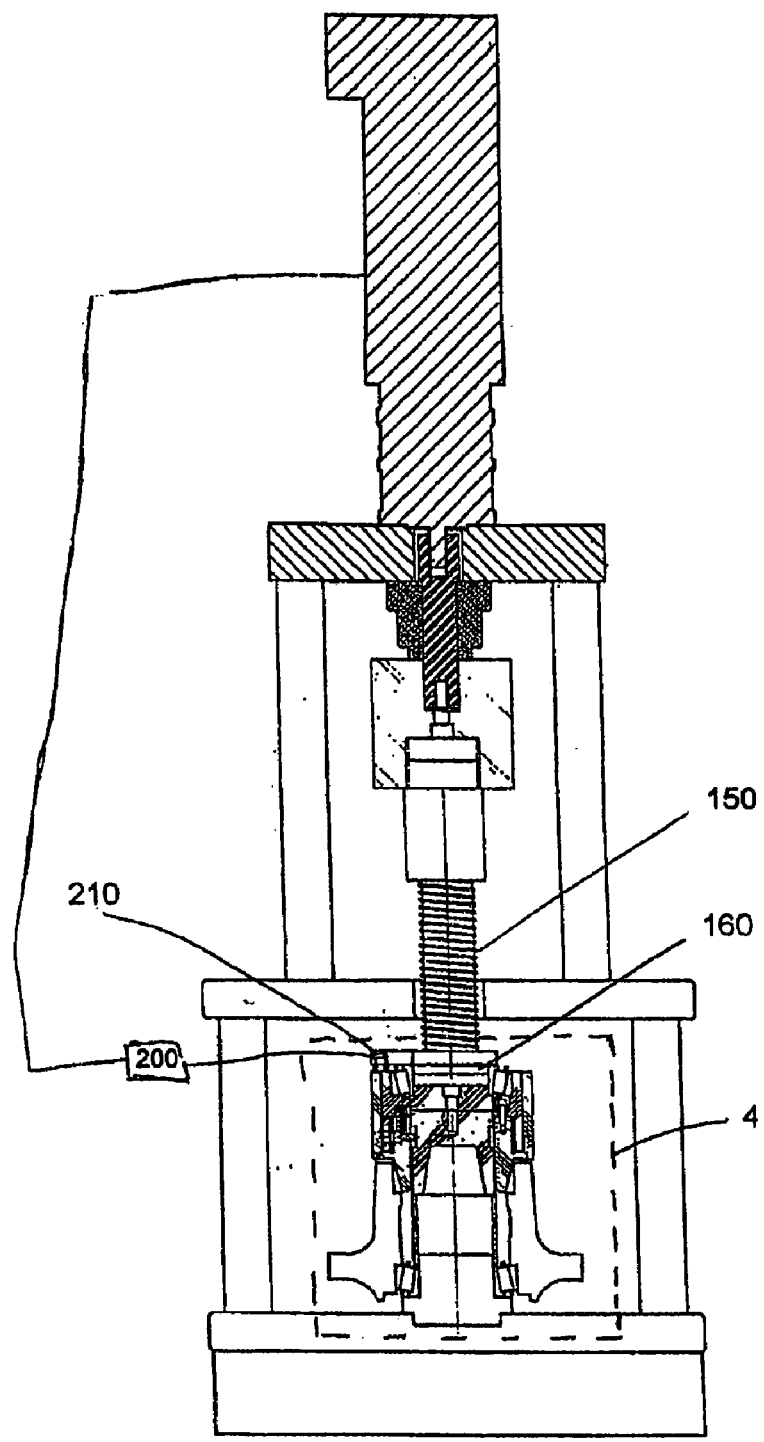
FIG. 3 is a side elevational view of the system for adjusting an adjustable spacer of FIG. 2 coupled to a force-application member.

A bearing assembly 1 including a first bearing 2 and a second bearing 4 is depicted in FIG. 1. The bearings may be mounted on a shaft or spindle 6. The spindle may comprise, for example, a central member (e.g., an axle, a shaft, and/or the like) that may rotate within a bearing portion. For instance, the spindle may comprise an axle of a vehicle or a shaft of a motor or speed reducer. Also, the central member may remain stationary and an outer housing or (e.g., wheel) hub 8 may rotate thereabout. In one example, the bearings may include a pair of identical but opposed tapered roller bearings. In addition, one or more of the bearings may comprise an unsealed or a sealed bearing.

Still referring to FIG. 1, bearings 2 and 4 may support a housing or (e.g., wheel) hub 8. For example, the hub may support a part of a wheel or tire (not shown). An adjustable spacer 10 may be located axially between the bearings, and radially between spindle 6 and the hub or housing 8. The adjustable spacer may include a deformable portion 40.

Further referring to FIG. 1, a deformable portion 40 of adjustable spacer 10 may serve to allow adjustment to, for instance, axial length of the adjustable spacer, and/or any number of other characteristics and/or behaviors of the adjustable spacer. For example, adjustment to the deformable portion of the adjustable spacer may allow preloading of bearing assembly 10. Preloading of the adjustable spacer may serve to provide a proper axial loading on the bearing assembly, including the adjustable spacer, to obtain optimal performance and/or maximal life, with substantial elimination of play in the bearings. In one example, the desired adjustment to the adjustable spacer may include an adjustment to an axial dimension of the spacer and/or a compression of the deformable portion 40 of the adjustable spacer.

An exemplary configuration for adjustable spacer 10 is presented herein, with further detail and discussion of exemplary feature(s) for the adjustable spacer being disclosed in co-owned U.S. Pat. Nos. 6,283,639, 6,004,040, 6,244,751, 4,067,585 and 5,549,397, which are hereby incorporated herein by reference above. An illustrative description of adjustment applicable and/or extendible to a number of such adjustable spacers is presented herein.

Again referring to FIG. 1, bearing 2 may comprise a tapered roller bearing that may include inner race 12 mounted on spindle 6, outer race 14 mounted in housing 18, and roller elements 16 positioned between the inner race 12 and the outer race 14. Bearing 4 may comprise a tapered roller bearing that may include inner race 22 mounted on the spindle, outer race 24 mounted in the housing, and roller elements 26 positioned between the inner race 22 and the outer race 24. Bearing 2 and/or bearing 4 may employ a roller cage 25 in order to hold the corresponding roller elements 16, 26 in proper position between the corresponding inner and outer races. For explanatory purposes, FIG. 1 depicts indirect mounting of the bearings. That is, outer race (e.g., cup) 14 may be located in bearing assembly 100 axially inward of inner race (e.g., cone) 12 of the bearing 2. Further, outer race (e.g., cup) 24 may be located in the bearing assembly 10 axially inward of inner race (e.g., cone) 22 of the bearing 4. In another example, direct mounting of the bearings may be employed, as will be appreciated by those skilled in the art. An exemplary direct mounting of bearings is disclosed in the above-incorporated application Ser. No. 09/130,166.

Referring still to FIG. 1, axial as well as radial support may be provided among various components of bearing assembly 10. For instance, outer race 24 of bearing 4 may provide axial support for housing 8, while also providing radial support thereto, such as for positioning thereof. Furthermore, the housing may be formed to abut outer race 14 of the bearing 2 along axial as well as radial surfaces. Such formation and/or positioning may allow alignment, support, and/or force transfer along a selected number of paths and/or with a selected number of interfaces, as will be understood by those skilled in the art.

In one example, additionally referring to FIG. 1, housing 8 may include inner shoulder 34 and outer shoulder 36. The inner shoulder may serve to receive outer race 4 of bearing 2. The outer shoulder may serve to receive outer race 24 of bearing 4. Adjustable spacer 10 may include a first end 38 and a second end 39. For instance, first end 38 may axially abut inner race 12 of bearing 2, and may radially abut a first location on spindle 6. The end 39 may axially abut inner race 22 of bearing 4, and may axially abut a second location on the spindle.

Referring again to FIG. 1, housing 8 may be mounted about outer races 14 and 24 for rotation of the housing about spindle 6, with roller elements 16 positioned between the outer race 14 and inner race 12, roller elements 26 positioned between the outer race 24 and inner race 22, and the inner races mounted on the spindle. In another example, the spindle may rotate within the housing. That is, the spindle and/or the housing may serve as, and/or resemble, a stator and/or a rotor, as will be appreciated by those skilled in the art.

In an exemplary embodiment depicted in FIGS. 2–6, a spacer-adjustment system 100 for adjusting at least one spacer of a bearing assembly is depicted. A force-transmitting member 120 is configured to operatively receive a force and to transmit the force to adjustable spacer 10. A preload regulator 140 is configured to operatively receive the force and to regulate an adjustment of the spacer.

Force-transmitting member 120 is configured to abut spacer 10 and to transmit force from a force-application member 150 (FIG. 3) to spacer 10. Force-application member 150 may include a screw, e.g., a screw of approximately 1 to 1.25 inch diameter, and about 12 threads per inch lead, as in a 1.25–12 unified national thread. The construction, operation, and use of screws is well known in the art. In another example, force-application member 150 may be a ball screw controlled by a servo-motor or a DC motor. In a different example, the screw may be, for instance, concentrically (e.g., relative to axis 150) arranged in a hollow of a hydraulic force-application member (e.g., cylinder). In a further example, two or more separate hydraulic force-application members (e.g., cylinders, not shown) may be arranged alongside and/or parallel to a (e.g., central) force-application member (e.g., screw). Moreover, force application member 150 may be any type of mechanical press controllable by a switch and which is not prone to over-travel, e.g., the press may be controllable to consistently cause it to stop upon a signal being sent thereto, or a switch being actuated.

An interface member 160 may also be present between force application-member 150 and both force-transmitting member 20 and preload regulator 140. Interface member 160 may be configured to operatively receive an end 151 of force-application member 150 via a current detector support 211 located between interface member 160 and end 151. Interface member 160 may further operatively engage force-application member 150 with force-transmitting member 120 and preload regulator 140. Such engagement of force-application member 150 with force-transmitting member 120 and preload regulator 140 may be via interface member 160 having an engaging-member 162 thereof which may be integral to, or separate from, interface member 160. More specifically, engaging-member 162 may abut a notch 121 of force-transmitting member 120 and may simultaneously operatively abut preload regulator 140, e.g., via roller elements 143. Further, force-application member 150 and interface member 160 may be integral to each other or separate from, and engagable with, each other.

Force-transmitting member 120 may include a top portion 122 connected to a bottom portion 124 by a non-conductive (e.g., nylon) screw 125. Further, top portion 122 and bottom portion 124 may be separated by an insulator 126, e.g., an electrical insulator having a G-10 designation and being 0.032 inch thick. Such insulation inhibits electrical conduction between top portion 122 and bottom portion 124. Preload regulator 140 may be substantially cylindrical in nature and may surround force-transmitting member 120 which may be located in a center cavity of preload regulator 140. Force-transmitting member 120 may be movable due to a force received from force-application member 150 via interface member 160. An end 123 of force-transmitting member 120 may abut spacer 10 to apply the force received from interface member 160 and force-application member 150 to spacer 10 thus allowing spacer 10 to be adjusted.

Preload regulator 140 includes a first portion 142 and a second portion 144. First portion 142 may abut engaging-member 162 and may be movable with force-application member 150 via interface-member 160 (e.g., engaging-member 162 thereof) and may be movable with force-transmitting member 120. Preload regulator 140 may be surrounded by a conducting jacket 155 which may have a cylindrical shape. Also, an air gap may be present between conducting jacket 155 and first portion 142 of preload regulator 140. For example, an air gap 156 may be about 0.020 inch. Such gap may prevent any electrical connection between conducting jacket 155 and first portion 142. Also, gap 156 could include electrical insulation therein or an insulative coating could be applied to first portion 142 and/or second portion 144 to provide electrical insulation therebetween. Such coatings are useful for mass production of preload regulator 140, for example.

Second portion 144 may have a bottom end 145, which abuts a race (e.g., outer race 24) of bearing assembly 1. Bottom end 145 may be tapered or otherwise configured to be received on, and to be longitudinally stationary relative to, bearing assembly 1. An aligning pin or screw 170 may be received in a first pin cavity 172 of first portion 142 and a second pin cavity 174 of second portion 144. Aligning pin 170 may connect first portion 142 and second portion 144 and maintain the portions longitudinally aligned relative to one another. An insulator 173 may provide electrical insulation between first portion 142 and pin 170 connected to second portion 144. Also, first portion 142 may have a first spring receiving cavity 146 and second portion 144 may have a second spring receiving cavity 147. A spring 180 may be received in first receiving cavity 146 and second receiving cavity 147. Spring 180 may be formed to be longer than a combination of the longitudinal dimensions of first spring receiving cavity 146 and second spring receiving cavity 147 such that a space or gap 185 exists between first portion 142 and second portion 144 in response to spring 180 being received in the cavities when spring 180 is in an uncompressed state.

Figure 6:
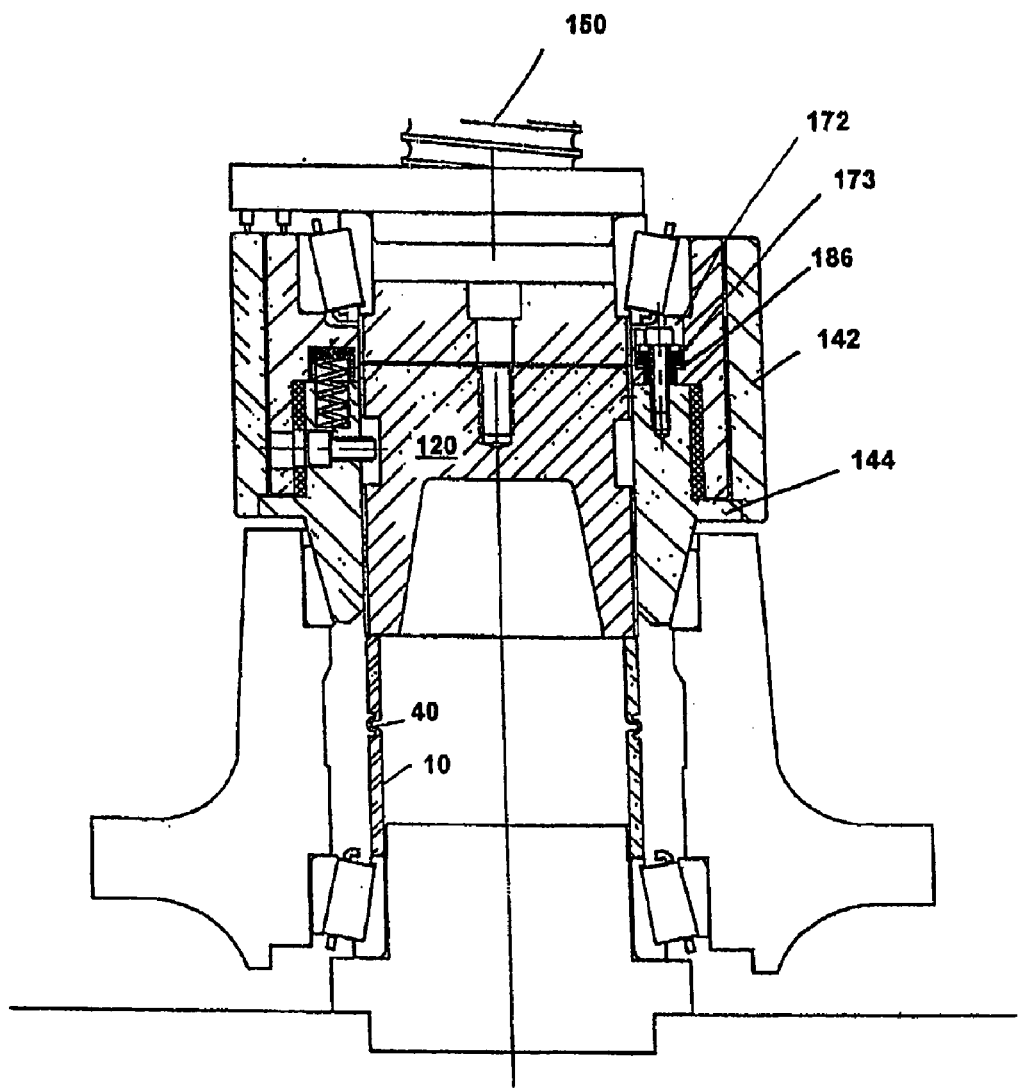
FIG. 6 depicts the spacer adjustment system of FIG. 4 with the force-application member in a terminal position and a first and second portion of the preload regulator contacting each other.

Spring 180 may be sized such that when inserted into first spring receiving cavity 146 and second spring receiving cavity 147, gap 185 is provided between a lateral extension 190 of first portion 142 and a top portion 195 of second portion 144. Such gap may be closed by movement of first portion 142 towards second portion 144 resulting from the force supplied by force-application member 150. More specifically, force-application member 150 may apply a force to interface member 160 to apply the force to first portion 142 via engaging-member 162 to close gap 185, as depicted in FIG. 6. Forward motion of force-transmitting member 120 may be stopped when the gap is closed to provide a desired adjustment to spacer 10, e.g., deformable portion 40.

Figure 4:
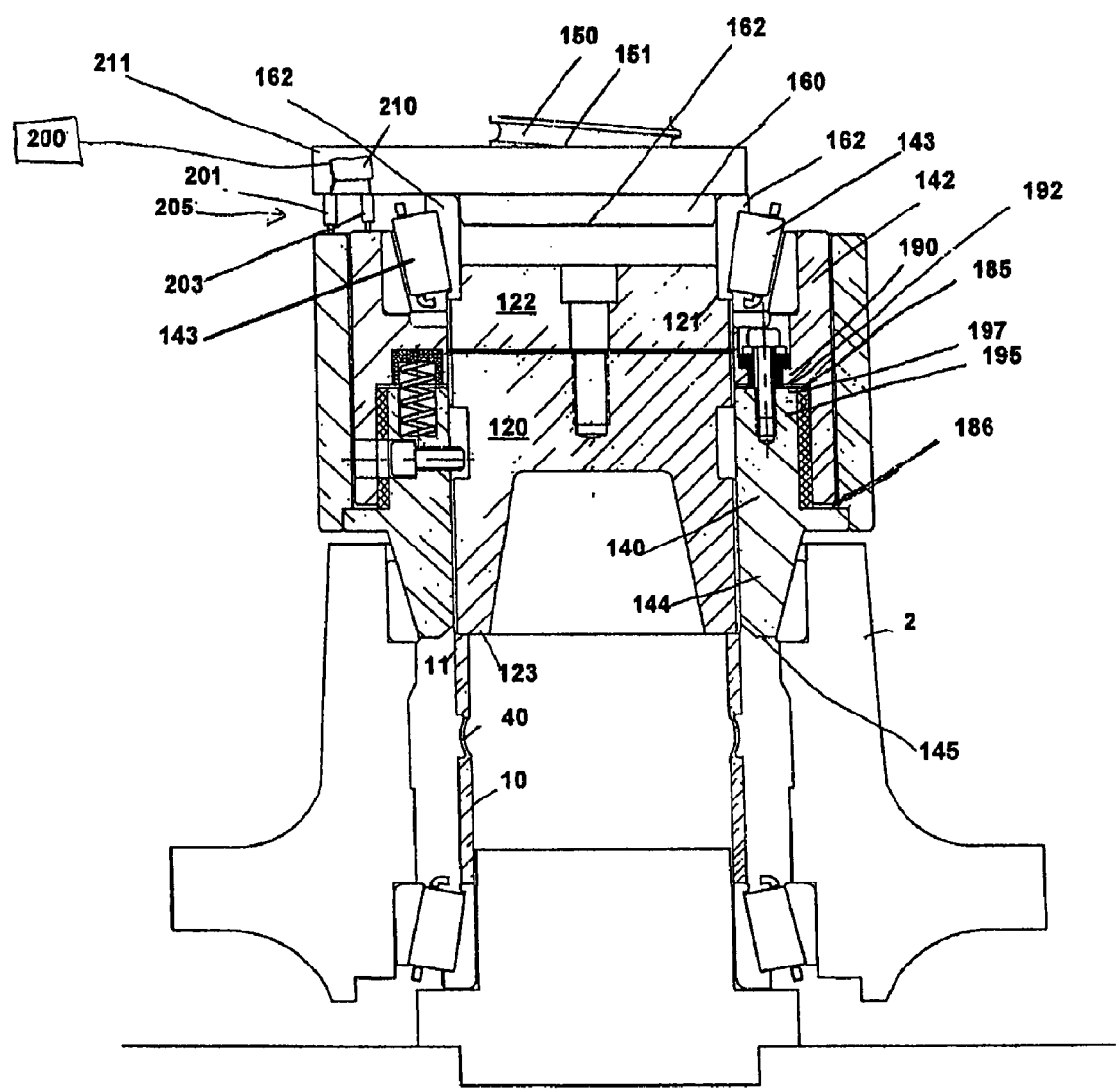
FIG. 4 is a side cross-sectional view of a portion of FIG. 3 depicting a force-application member in a home position and a gap between a first portion and a second portion of a preload regulator.

Further, lateral extension 190 of first portion 142 may include a first sensor 192 on a bottom end thereof and top portion 195 of second portion 144 may include a second sensor 197, as best depicted in FIG. 4. First sensor 192 and second sensor 197 may be operatively coupled to a controller 200 which may be coupled to force-application member 150. First sensor 192 refers to an area of first portion 142 where an electrical contact may be made with an area of second portion 144 which is referred to as second sensor 197 herein. In one example, conducting jacket 155 may be connected to, and electrically coupled to, second sensor 197 and further may be coupled to an electrical current detector 210 via an electrical conducting brush 201. Further, first portion 142 of preload regulator 140 may be coupled to current detector 210 via a second electrically conducting brush 203. Electrical current detector 210 may thus be coupled to controller 200, which may be separate from or integral to current detector 210. The use of brushes 205 (e.g., brush 201 and brush 203) allows first portion 142 to be rotated yet still remain in electrical connection with current detector 210.

The closing of gap 185 and the resulting contact between first sensor 192 and second sensor 197 allows electrical current detector 210 to detect a completed circuit resulting from the contact of first sensor 192 and second sensor 197. Current detector 210 may indicate such contact to controller 200 to detect the closing of the gap. Controller 200 may control movement of force-application member 150 and upon the closing of gap 185, controller 200 may control the movement of force-application member 150 to stop, continue and/or reverse its forward motion. For example, force-application member 150 may stop its forward motion upon contact of first portion 142 and second portion 144 to cease compression of spacer 10 upon such contact. In another example, force-application member 150 may continue to apply force to force transmitting-member 120 for a specified time and/or distance after such contact when it is desired to continue adjusting spacer 10 after such contact. First sensor 192 and second sensor 197 may be integral to first portion 142 and second portion 144, respectively, or the sensors may be structurally separate from, and attached to, first portion 142 and second portion 144. Alternatively, controller 200 could be integral to force-application member 150 and/or first sensor 192 or second sensor 197 such that a contacting of first sensor 192 and second sensor 197 may cause a regulation of the motion of force-application member 150.

An insulation cavity 215 having electrical insulation therein may be located between first portion 142 and second portion 144 to inhibit electrical contact therebetween, particularly when first portion 142 and second portion 144 have sensors integral thereto. For example, first portion 142 and second portion 144 may be formed of an electrical conductor thus making such insulation necessary and making each portion itself a sensor. It will be understood by one skilled in the art that insulation may be located in various locations to electrically separate first portion 142 and second portion 144 and therefore to allow electrical contact therebetween only at an interface of first sensor 192 and second sensor 197. Thus, contact at such an interface point may complete an electrical circuit and provide an indication of such contact.

Also, first portion 142 and second portion 144 may be separable from one another to allow different springs to be substituted for spring 185 in first spring receiving cavity 146 and second spring receiving cavity 147. A locking screw 220, which holds first portion 142 and second portion 144 together, may also be removable to allow separation of first portion 142 and second portion 144.

Returning to FIG. 2, a desired compression distance of spacer 10 may be regulated by a longitudinal dimension L2 of force-transmitting member 120, which signifies a distance between a bottom side 123 and a notch 121 as best indicated in FIG. 2. More specifically, force-transmitting member 120 may be machined or formed having a particular longitudinal dimension L2 based on a desired preload or compression of spacer 10. L1 is a distance that an outer race portion 250 of first portion 142 is offset from outer race 24. A relationship between L1 and L2 follows:

$$L1+B=L2-R-P$$

B refers to a lower bearing deflection due to the force applied by force-application member 150; R refers to a spacer resilience; and P refers to a final preload setting. Therefore, a final preload of deformable portion 40 of spacer 10 can be determined by regulation of these variables. For example, force-transmitting member 120 may be machined to have a desired dimension of L2 based on assumed or desired values for the other parameters.

For explanatory purposes, a description of a method for adjusting spacer 10 is provided. Preload regulator 140 having a force-transmitting member 120 received in a cavity thereof may be received on a bearing assembly 1. More specifically, force-transmitting member 120 may abut a top end 11 of spacer 10 and preload regulator 140 may be received on a top end 2 of bearing assembly 1. Interface member 160 may be received on first portion 142 of preload regulator 140. Spring 180 may be received in first spring receiving cavity 146 and second spring receiving cavity 147 of first portion 142 and second portion 144, respectively.

Figure 5:
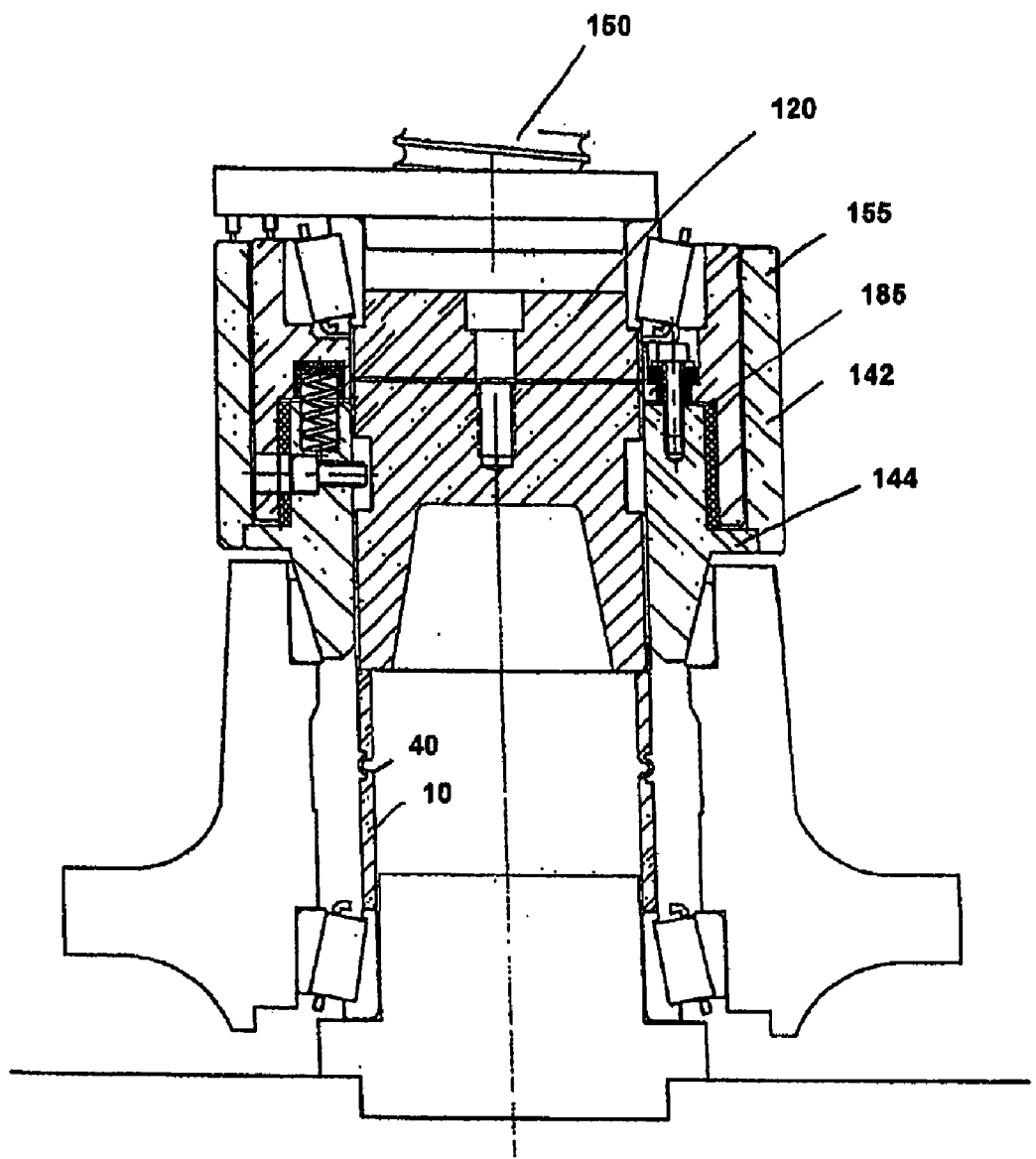
FIG. 5 depicts the spacer adjustment system of FIG. 4 with the force-application member in a position between a home position and a terminal position.

FIG. 4 depicts force-application member 150 in a home position prior to it being moved toward spacer 10. In such position, gap 185 is at its largest longitudinal dimension. Controller 200 coupled to first sensor 192 and second sensor 197 of preload regulator 140 via current detector 210, brushes 205 and conducting jacket 155 may cause force-application member 150 to move toward spacer 10. FIG. 5 depicts deformable portion 40 of spacer 10 being compressed by the movement of force-application member 150. FIG. 6 depicts deformable portion 40 being compressed at its maximum amount and force-application member 150 and force-transmitting member 120 being at their farthest longitudinal position thus causing contact between first sensor 192 and second sensor 197. Also illustrated is a second gap 186 located between insulator 173 and a bottom of cavity 172, (e.g., a top side of first portion 142) which is caused by the movement of first portion 142 to abut second portion 144. Upon the contact of first sensor 192 and second sensor 197, controller 200 may cause the forward motion of force-application member 150 to stop. Spacer 10 is thereby compressed a distance equal to a dimension dependent on a longitudinal dimension of force-transmitting member 120 (e.g., L2). For example, a contact between first sensor 192 and second sensor 197 results in a completed circuit between first brush 201, second brush 203, first portion 142, second portion 144, and conducting jacket 155 with such connection being detected by current detector 210. An indication of such connection is sent by current detector 210 to controller 200 which causes a change (e.g., a stop or reversal) in the motion of force-application member 150. Alternatively, upon contact of first sensor 192 and second sensor 197, controller 200 may control a servo-motor (not shown) of force-application member 150 to continue compressing spacer 110 for a desired time and/or distance to compress deformable portion 40 of spacer 10 or desired amount.

As will be evident to one skilled in the art, spacers of various dimensions and shapes may be adjusted in a similar manner through the substitution of various spacers, various sized force-transmitting members, various sized preload regulators and portions thereof, various controllers, servo-motors, force-application members, and sensors. Further, the detection of a contact between first sensor 192 and second sensor 197 may be performed in any number of ways including external sensors, controllers, or other means of detecting such contact and providing such information to the controller, or other means for regulating a force applied to spacer 10. Further, a contact between first portion 142 and second portion 144 may be detected at locations other than first sensor 192 and second sensor 197 such as, for example, at an intersection point 187 between first portion 142 and second portion 144. Also, in addition to forming force-transmitting member 120 at a particular longitudinal dimension to determine a amount of compression of spacer 10 in conjunction with force-application member 150, a width of insulator 126 between top portion 122 and bottom portion 124 of force-transmitting member 120 may be adjusted to provide desired preload or compression to spacer 10.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A spacer-adjustment system for adjusting at least one spacer of a bearing assembly, said system comprising:
   a force-transmitting member configured to operatively receive a force and to transmit the force to an adjustable spacer; and
   a preload regulator comprising:
      a first portion and a second portion movable relative to each other, said first portion being movable in response to the force and said second portion being received by and stationary relative to the bearing assembly; and
      a controller coupled to said first portion and said second portion, said controller configured to detect an electrical contact between said first portion and said second portion.

2. The system of claim 1 further comprising a gap between said first portion and said second portion to inhibit electrical contact between said first portion and said second portion.

3. The system of claim 2 further comprising a spring for maintaining said gap, in response to an absence of the force.

4. The system of claim 3 further comprising a spring cavity between said first portion and said second portion and wherein said cavity is configured to receive said spring.

5. The system of claim 1 further comprising means for maintaining a gap between said first portion and said second portion, when the force is absent.

6. The system of claim 1 further comprising a force-application member for providing the force, said controller configured to control the force provided by the force-application member to adjust the at least one spacer.

7. The system of claim 6 wherein controller is configured to receive a signal in response to said first portion contacting said second portion.

8. The system of claim 7 wherein said controller is configured to control the force-application member based on the signal.

9. The system of claim 7 wherein said controller is configured to control a speed of the force-application member in response to receiving the signal.

10. The system of claim 7 wherein said preload regulator further comprises a current detector and said current detector provides the signal to the controller in response to a contact between said first portion and said second portion.

11. The system of claim 10 further comprising a conducting jacket for conducting electricity between said second portion and said current detector.

12. The system of claim 11 further comprising at least one conducting brush for operatively conducting electricity between said current detector and at least one of said first portion and said second portion.

13. The system of claim 10 wherein said controller and said current detector are integral to each other.

14. The system of claim 1 wherein said force-transmitting member is located radially inside said preload regulator.

15. A method for adjusting at least one spacer of a bearing assembly, the method comprising:
   applying a force to a force-transmitting member and a preload regulator to move the force-transmitting member to operatively transfer the force to the at least one spacer;
   receiving the force at the preload regulator for regulating a desired adjustment to the at least one spacer, the regulator comprising:
      a first portion and a second portion movable relative to each other, the first portion being operatively movable with the force-transmitting member and the second portion being received by, and stationary relative to, the bearing assembly; and
   contacting the first portion and the second portion in response to the force to cause the preload regulator to control the force to control the movement of the force-transmitting member to regulate the desired adjustment of the at least one spacer.

16. The method of claim 15 further comprising locating a spring between the first portion and the second portion to provide a gap between the first portion and the second portion.

17. The method of claim 15 further comprising applying the force by a force-application member to the force-transmitting member to move the force-transmitting member to apply the force to the at least one spacer.

18. The method of claim 15 further comprising detecting the contact of the first portion and the second portion.

19. The method of claim 18 wherein the preload regulator comprises a controller and further comprising coupling the controller to the first portion and the second portion and further comprising providing a message to the controller in response to detecting the contact.

20. The method of claim 19 further comprising a current detector detecting the contact of the first portion and the second portion and providing the message to the controller.

21. The method of claim 20 wherein the controller and the current detector are integral to each other.

22. The method of claim 19 further comprising controlling a force-application member to apply the force to the force-transmitting member in response to the message.

23. The method of claim 22 wherein the controlling the force-application member comprises controlling movement of the force-application member by the controller.

* * * * *